(12) United States Patent
Zeitler et al.

(10) Patent No.: US 8,168,092 B2
(45) Date of Patent: May 1, 2012

(54) UNIAXIAL PRESSING AND HEATING APPARATUS

(75) Inventors: Guenter Zeitler, Aachen (DE); Herbert Schreinemacher, Baesweiler (DE); Cornelis Reinder Ronda, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 241 days.

(21) Appl. No.: 12/091,583

(22) PCT Filed: Oct. 17, 2006

(86) PCT No.: PCT/IB2006/053812
§ 371 (c)(1),
(2), (4) Date: Apr. 25, 2008

(87) PCT Pub. No.: WO2007/049186
PCT Pub. Date: May 3, 2007

(65) Prior Publication Data
US 2008/0286140 A1    Nov. 20, 2008

(30) Foreign Application Priority Data
Oct. 27, 2005   (EP) .................................... 05110054

(51) Int. Cl.
*C04B 35/50*         (2006.01)
(52) U.S. Cl. ...................... 264/1.22; 264/319; 264/345

(58) Field of Classification Search .................. 264/112, 264/1.22, 319, 345
See application file for complete search history.

(56) References Cited

U.S. PATENT DOCUMENTS

| | | | | |
|---|---|---|---|---|
| 3,987,658 A | * | 10/1976 | Herold | 72/342.1 |
| 4,466,929 A | * | 8/1984 | Greskovich et al. | 264/1.22 |
| 4,744,943 A | * | 5/1988 | Timm | 419/10 |
| 4,863,882 A | * | 9/1989 | Matsuda et al. | 501/94 |
| 4,920,640 A | * | 5/1990 | Enloe et al. | 29/852 |
| 4,954,170 A | | 9/1990 | Fey et al. | |
| 5,296,163 A | | 3/1994 | Leppert et al. | |
| 5,676,891 A | * | 10/1997 | Boedinger | 264/1.22 |

FOREIGN PATENT DOCUMENTS

| | | |
|---|---|---|
| DE | 4224931 C2 | 11/1995 |
| GB | 1166779 | 10/1969 |
| JP | 10120469 A | 12/1998 |
| JP | 2004278940 A | 7/2004 |

* cited by examiner

*Primary Examiner* — Richard Crispino
*Assistant Examiner* — Elizabeth Royston

(57) ABSTRACT

The present invention is directed towards an uniaxial pressing and heating apparatus for the production of ceramic materials comprising a heater (4), a mold (5) and a die (3), wherein a mold (5) is arranged inside a heater (4) and the mold (5) receives a die (3) at at least one opening and wherein the die (3) is actuated under pressure into the mold (5), wherein the ratio of the length of the heater (4) and the length of the mold (5) is from $\geq 1.5$ to $\leq 4$. The invention is further directed towards a process for the production of ceramics and towards a ceramic material.

16 Claims, 4 Drawing Sheets

UNIAXIAL PRESSING AND HEATING APPARATUS

The present invention is directed towards a uniaxial pressing and heating apparatus.

More specifically, it is directed towards a uniaxial pressing and heating apparatus for the production of ceramic materials comprising a heater, a mould and a die, wherein a mould is arranged inside a heater and the mould receives a die at at least one opening and wherein the die is actuated under pressure into the mould.

The invention is further directed towards a process for the production of ceramics and towards a ceramic material.

$Gd_2O_2S$:Pr(GOS) is an efficient X-ray phosphor which can be used in computer tomography (CT) scanners. However, the phenomenon of afterglow, which either increases the time needed to perform a CT scan or which reduces the quality of the image, hampers the practical application of GOS material. The afterglow characteristics of GOS ceramic wafers strongly depend upon the production process itself. The spatial homogenity of the physical characteristics of the GOS material is of prime importance for the use in medical CT scanners. Inhomogeneities of the wafers produced are known to occur due to temperature non-uniformities in the production process of GOS wafers.

In order to scale up the production of GOS ceramic wafers from one wafer at a time to several wafers at a time, the temperature of the production process needs to be spatially uniform even at larger production scales. However, this problem has not yet been satisfactorily addressed by the state of the art.

Published Japanese patent application JP 2004-278940 discloses a burning furnace and a temperature adjusting method with the object of controlling a temperature in a plurality of heating zones and being free of the uneven distribution of the temperature in the furnace. In this disclosure, a heating chamber, surrounded by a heat insulating material, is mounted inside of a furnace body as an outer frame of the burning furnace. Heating zones for raising the temperature are in the heating chamber are respectively controlled by different power supply circuits. Temperature measuring ports for measuring the temperature of the heating zones are inserted into the heating chamber through the furnace body and the heat insulating material from the outside of the furnace body. The number of temperature measuring ports are same as or more than the number of heating zones. The temperature in the heating chamber is measured by using a radiative thermometer from the temperature measuring ports.

However, there are drawbacks in the state of the art. For example, it is not disclosed how to uniformly heat and press a larger quantity of material at the same time.

GB 1,166,779 discloses an apparatus for successive hot pressing of refractory materials, comprising in combination: a number of reusable refractory open-ended shells for containing the refractory material; pistons which can be slidably fitted within said shells at the two ends thereof; a housing adapted to contain a substantially oxygen-fee atmosphere or to be evacuated; means for introducing and conveying a shell and associated pistons into and within said housing; a susceptor as hereinbefore defined, within said housing, having a cavity adapted to receive a shell; means for heating the susceptor (as hereinbefore defined); means for successively introducing and positioning the shells and associated pistons within the cavity, applying compacting pressure to the pistons, and removing the shells and pistons from the cavity; means for cooling the compacted material; and means for removing the shells and the compacted material from the housing.

U.S. Pat. No. 4,954,190 discloses that high density compacts are made by providing a compactable particulate combination of class 1 materials selected from at least one of Ag, Cu and Al, with material selected from at least one of CdO, SnO, $SnO_2$, C, Co, Ni, Fe, Cr, $Cr_3C_2$, $Cr_7C_3$, W, WC, $W_2C$, WB, Mo, $Mo_2C$, MoB, TiC, TiN, $TiB_2$, Si, SiC, $Si_3N_4$, usually by mixing powders of each, step (1); uniaxially pressing the powders to a density of from 60% to 95%, to provide a compact, step (2); hot densifying the compact at a pressure between 352 $kg/cm^2$ (5,000 psi) and 3,172 $kg/cm^2$ (45,000 psi) and at a temperature from 50° C. to 100° C. below the melting point or decomposition point of the lower melting component of the compact, to provide densification of the compact to over 97% of theoretical density, step (3); and cooling the compact, step (4). Compacts are placed into oven pans and a plurality of pans are stacked before pressing.

DE 42 24 931 C2 relates to a process for manufacturing high density, translucent scintillation ceramics of a rare earth oxysulfide, wherein a pigment powder of the general formula $(M_{1-x}Ln_x)_2O_2S$ is precipitated from an acidic aqueous solution of a rare earth sulfite $(M_{1-x}Ln_x)_2(SO_3)_2$ with M being at least one element of the group Y, La and Gd, Ln being at least one element of the group Eu, Ce, Pr, Tb, Yb, Dy, Sm and Ho and $1 \cdot 10^{-6} \leq x \leq 2 \cdot 10^{-1}$; followed by thermal reduction. The pigment powder has a specific surface area of at least 10 $m^2/g$ (BET) and pressed under dry and cold conditions at a pressure of 0.1 to 10 $kN/cm^2$. Afterwards it is uniaxially pressed at a temperature of 1000° C. to 1500° C. and a pressure of 0.1 to 20 $kN/cm^2$ until a density of at least 99.9% of the theroretical density is reached.

The object of the present invention is to overcome at least one of the drawbacks in the art. More specifically, the object is to provide a uniaxial pressing and heating apparatus which displays an extended isothermal zone in order to process a larger quantity of material in one step.

According to the present invention, the above described object can be achieved by providing a uniaxial pressing and heating apparatus for the production of ceramic materials comprising a heater, a mould and a die, wherein a mould is arranged inside a heater and the mould receives a die at at least one opening and wherein the die is actuated under pressure into the mould, wherein the ratio of the length of the heater and the length of the mould is from $\geq 1.5$ to $\leq 4$ and wherein the material of the mould is graphite or a solid-solution hardened and particle-strengthened molybdenum-based alloy comprising titanium carbide and zirconium carbide.

The term "hot uniaxial pressing" as used in the context of the present invention is well recognised in the art and to be understood as involving the compaction of powder into a rigid mould by applying pressure in a single axial direction through a rigid die or piston under the application of heat.

Ceramic materials are to be understood as being made from inorganic materials.

A heater for an apparatus according to the present invention can be, but is not limited to, a graphite heater, a tungsten mesh heater, a molybdenum mesh heater and/or a molybdenum disilicide heater. These heater types are able of providing operating temperatures of $\geq 800°$ C. to $\leq 2200°$ C. and maximum temperatures of $\geq 800°$ C. to $\leq 2500°$ C. in the material to be heated.

A mould according to the present invention is to be understood as a hollow form or matrix for shaping a substance. A die according to the present invention is to be understood as a male die part.

The length of the heater and the length of the mould according to the present invention are to be understood as the length along the longest directional axis. The longest directional axis is the axis which is parallel to the longest orientation of the heater or mould, respectively.

The mould being arranged inside a heater that the heater surrounds the mould at least partially. This mould has at least one opening which is suitable for receiving a die in order to exert pressure upon the inner contents of the mould. The pressure can be exerted by a movable die via a piston. The mould can also comprise a second opening to receive a second die. Mould, die and heater can be centered along a rotational axis.

It has now been found that if the ratio of the length of the heater and the length of the mould is from $\geq 1.5$ to $\leq 4$, the isothermal zone within the heating and pressing apparatus is extended without wasting energy by heating unwanted space. It is also envisioned that the ratio of the length of the heater and the length of the mould is from $\geq 2.0$ to $\leq 3.5$ or that the ratio of the length of the heater and the length of the mould is from $\geq 2.5$ to $\leq 3.0$.

The isothermal zone is defined as a space within the apparatus according to the present invention whose temperature does not differ by more than 6° C. during operation of the apparatus and after thermal equilibration. This temperature variation is tolerable in hot uniaxial pressing for the production of homogenous GOS wafers.

In order to determine the extent of the isothermal zone, process temperature control rings (PTCRs) can be used. The shrinkage of such PTCRs, which occurs upon heating, is dependent on the entire thermal process which they have been exposed to. Hence, the evaluation of the resulting shrinkage values is an indication of the thermal conditions that occurred in the specific place where they have been positioned during the heating process. So-called "ring temperatures" can be derived from a PTCR type specific list which is provided by the supplier of the PTCRs. For example, the process temperature control rings can be obtained as type STH from Ferro Electronic Company B. V., Uden, The Netherlands. Prior to measurements, the PTCRs need to have their binder removed. This is achieved by heating the rings at 750° C. in air for two hours with a heating/cooling rate of 3 K/minute.

Without being bound to a certain theory, it is believed that with to the length ratios of the heater and the mould according to the present invention the temperature distribution during heating and pressing within the material to be processed is more uniform as heat convection processes can occur more efficiently.

In a preferred embodiment of the present invention, the material of the mould and/or die has a thermal conductivity of $\geq 50$ W/m K to $\leq 150$ W/m K. The thermal conductivity can be determined according to ISO 8894. It is also possible that the thermal conductivity of the mould and/or die material has a thermal conductivity of $\geq 60$ W/m K to $\leq 140$ W/m K or a thermal conductivity of $\geq 70$ W/m K to $\leq 130$ W/m K. Thermal conductivities in this range allow for an "oven in an oven" operation which means that the material inside the mould and/or die is heated uniformly.

Suitable materials include, but are not limited to, graphite and TZM, a solid-solution hardened and particle-strengthened molybdenum based alloy. TZM comprises titanium carbide and zirconium carbide. Suitable graphite may be obtained, for example, from Carbon Industrie-Produkte GmbH, Buchholz-Mendt, Germany as grade CB 26. Suitable TZM may be obtained, for example, from Plansee GmbH, Reutte, Austria.

In a further preferred embodiment of the present invention, the material of the mould and/or die has a compression strength of $\geq 50$ MPa to $\leq 300$ MPa. The compression strength can be determined according to ISO 604. It is also possible that the mould and/or die material has a compression strength of $\geq 100$ MPa to $\leq 250$ MPa or a compression strength of $\geq 120$ MPa to $\leq 180$ MPa. Compression strengths in this range allow for high pressure operations leading to compact ceramics from powder without losing structural integrity of the mould and/or die. Suitable materials include, but are not limited to, graphite and TZM, which have already been described above.

In a further preferred embodiment of the present invention, the inner diameter of the mould is at least $\geq 10$ mm. It is also possible that the inner diameter of the mould is at least $\geq 20$ mm or that the inner diameter of the mould is at least $\geq 70$ mm. Thus, it is possible to process material leading to ceramic wafers of sizes routinely used in industrial applications.

In a further preferred embodiment of the present invention, the arrangement of heater and mould and/or die is substantially rotationally symmetric with respect to a vertical symmetry axis. A vertical symmetry axis is to be understood as an axis, which is parallel to the longest orientation of the heater or mould, respectively. The cylinder symmetric orientation of heater and mould and/or die allows heat to be transferred uniformly into the material inside the die and thus to create an isothermal zone.

In a further embodiment of the present invention, the arrangement of heater and mould and/or die is substantially mirror symmetric with respect to a horizontal symmetry axis. A horizontal symmetry axis is to be understood as an axis, which is perpendicular to a vertical symmetry axis. This mirror symmetric orientation allows for an even heat transfer within the material inside the die and thus to create an isothermal zone.

The invention further relates to a process for the production of ceramics, comprising the steps of:

a) placing a graphite solid into a mould;

b) placing a molybdenum foil onto the graphite solid of step a);

c) placing ceramic powder onto the molybdenum foil of step b);

d) if desired, placing additional alternating layers of molybdenum foil and ceramic powder onto the ceramic powder of step c);

e) alternatively, if desired, placing alternating layers of molybdenum foil, ceramic powder and graphite solid onto the ceramic powder of step c);

f) arranging the second to last layer of the resultant stack to be molybdenum foil;

g) arranging the last layer of the resultant stack to be graphite solid;

h) covering the last layer with a graphite solid;

i) creating a vacuum of $\geq 1 \times 10^{-8}$ bar to $\leq 1 \times 10^{-3}$ bar within the pressing apparatus;

j) heating to a temperature of $\geq 1000°$ C. to $\leq 1400°$ C.; and k) applying a pressure of $\geq 100$ MPa to $\leq 220$ MPa; and wherein the ceramic powder comprises $Gd_2O_2S$ doped with an element selected from the group comprising Eu, Tb, Yb, Dy, Sm, Ho, Ce and/or Pr.

This allows for the production of X-ray phosphors with low afterglow times and a high spatial uniformity.

In this process, it is envisioned to create a large single block of ceramic material as described in steps a), b), c), f)-k)). This has the advantage of using the isothermal zone for ceramics pressing to its fullest extent. The resultant block of ceramic material can then be sawn into separate wafers.

It is also envisioned to create single layers of ceramic powder to be pressed and to divide these layers by molybdenum foil as described in steps a), b), c), d), f)-k). This eliminates certain steps of the post-processing, which would be necessary in case of a large single ceramics block, especially sawing into separate wafers.

It is also envisioned to further place graphite solids between the layers of molybdenum foil and ceramics powder as described in steps a), b), c), e)-k. This allows for easier separation of the pressed stacks from the mould.

Covering the ceramic powder with molybdenum foil serves the purpose of evenly transferring heat and pressure to the powder. Furthermore, the compacted ceramic and the molybdenum foil may be separated easily. It is preferred that the molybdenum foil has a thickness of 0.2 mm. However, it is possible that the thickness of the molybdenum foil is in the range of $\geq 0.05$ mm to $\leq 0.5$ mm. Molybdenum foil can be obtained, for example, from Plansee GmbH, Reutte, Austria. It has been found advantageous that the width of the molybdenum foil piece is slightly less than the inner diameter of the mould. For example, the width of the molybdenum foil piece can be from $\geq 0.2$ mm to $\leq 0.4$ mm less than the inner diameter of the mould or the width of the molybdenum foil piece can be from $\geq 0.29$ mm to $\leq 0.31$ mm less than the inner diameter of the mould. Lowering the diameter with respect to the inner diameter of the mould enables the ceramic powder stack to be evacuated while at the same time still providing sufficient pressure and heat transfer.

Dividing the assemblies of molybdenum foil-ceramic powder-molybdenum foil by graphite solids enables vacuum to be applied to the entire arrangement of stacks due to the porosity of the graphite. To ensure rapid evacuation, it is favourable that the graphite has a porosity of about 20%. Furthermore, graphite displaying these porosities can be made in a form-fitting and form stable manner with respect to the mould without compromising its function.

Creating a vacuum of $\geq 1 \times 10^{-8}$ bar to $\leq 1 \times 10^{-3}$ bar within the pressing apparatus serves the dual purpose of enabling a better compaction of the powder to be pressed and to decrease the risk of oxidation of the components inside the mould when heat is applied. In this respect, it is also possible to create a vacuum of $\geq 1 \times 10^{-6}$ bar to $\leq 1 \times 10^{-4}$ bar or to create a vacuum of $\geq 1 \times 10^{-5}$ bar to $\leq 5 \times 10^{-5}$ bar.

During heating to a temperature of $\geq 1000°$ C. to $\leq 1400°$ C. grain growth takes place in the ceramic and a decline of residual porosity occurs, resulting in an increase of the transparency of the ceramic. It is also possible to heat to a temperature of $\geq 1100°$ C. to $\leq 1300°$ C. or to a temperature of $\geq 1200°$ C. to $\leq 1250°$ C.

The actual compacting of the ceramic powder takes place at pressures of $\geq 100$ MPa to $\leq 220$ MPa to yield a transparent and uniform ceramic wafer. It is also possible to apply pressures from $\geq 110$ MPa to $\leq 210$ MPa or to apply pressures from $\geq 150$ MPa to $\leq 200$ MPa.

In a preferred embodiment of the present invention, at least one surface which is in contact with the ceramic powder is at least partially covered with boron nitride. Boron nitride is a high temperature resistant lubricant which does not undergo oxidation during the manufacturing process. Surfaces covered with boron nitride do not stick to each other. Therefore, pressed ceramic wafers can be isolated without risking wafer fracture. Boron nitride may be obtained, for example, as grade S2 from Wacker Chemie, Germany. This grade has a mean particle size of 4 µm.

In a further preferred embodiment of the present invention, the ceramic powder comprises $Gd_2O_2S$ doped with an element selected from the group comprising Eu, Tb, Yb, Dy, Sm, Ho, Ce and/or Pr. This allows for the production of X-ray phosphors with low afterglow times and a high spatial uniformity.

The present invention further relates to a ceramic material, which is produced by a process according to the present invention and its use in medical imaging devices.

The present invention is further illustrated in FIGS. 1-4.

Figure 1:
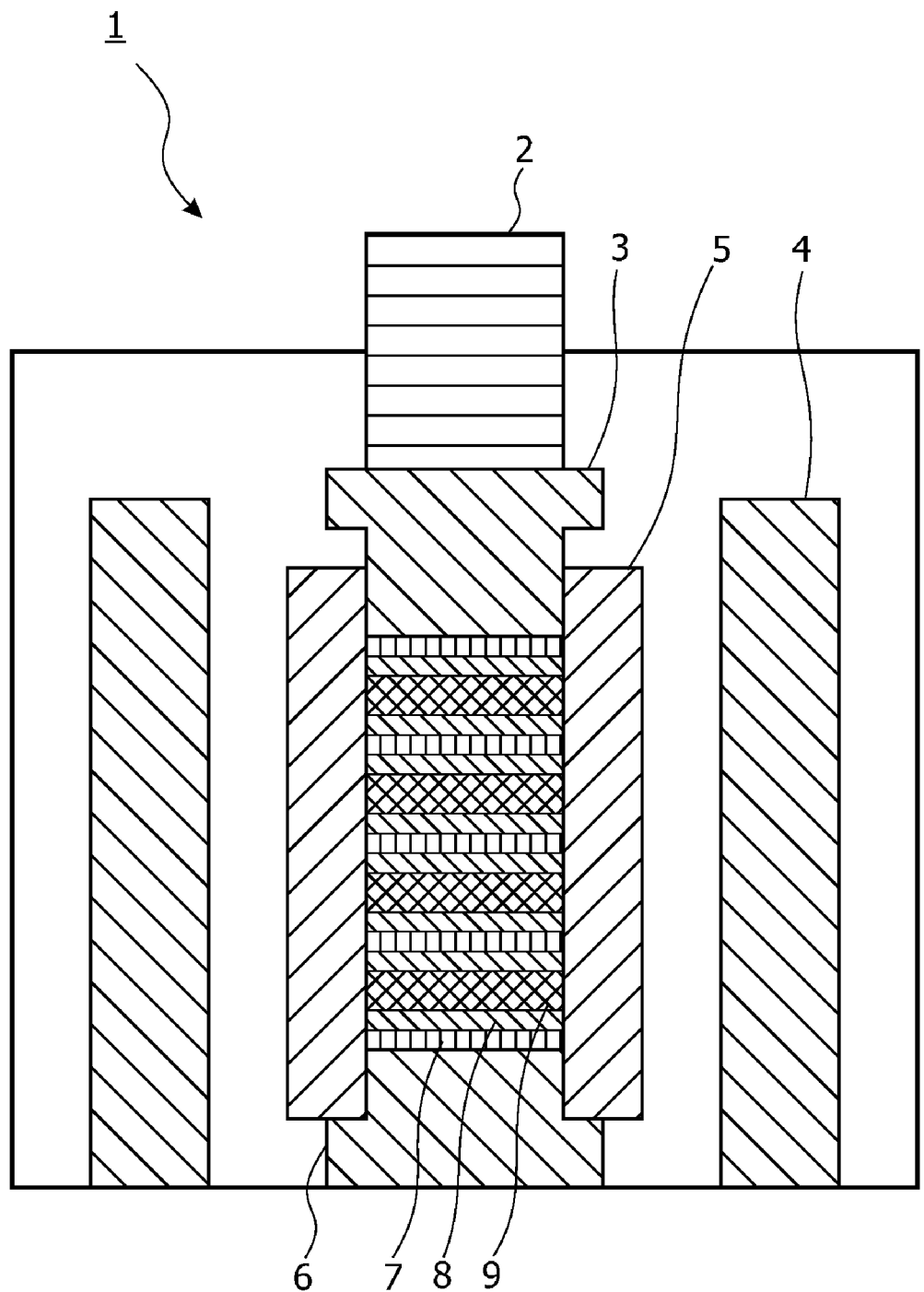
FIG. 1 shows an apparatus according to the present invention designed for hot uniaxial pressing with pressure being applied from one direction.

FIG. 1 shows an apparatus (1) according to the present invention designed for hot uniaxial pressing with pressure being applied from one direction. A piston (2) transfers pressure onto a die (3). This die (3) fits inside a mould (5). On the bottom of the mould (5), a second die (6), which is in a fixed position, is located. This arrangement is heated by a heater (4). Inside the mould there are layers of ceramic powder (9) who are in contact with molybdenum foil (8). The molybdenum foil layers in turn are in contact with layers of graphite solids (7). It is to be noted that piston (2), dies (3) and (6), heater (4), mould (5) and the layers of graphite (7), molybdenum foil (8) and ceramic powder (9) are arranged in a cylinder symmetric fashion around a vertical symmetry axis. It is further to be noted that heater (4), mould (5) and layers of graphite (7), molybdenum foil (8) and ceramic powder (9) are arranged in a mirror symmetric fashion around a horizontal symmetry axis.

Figure 2:
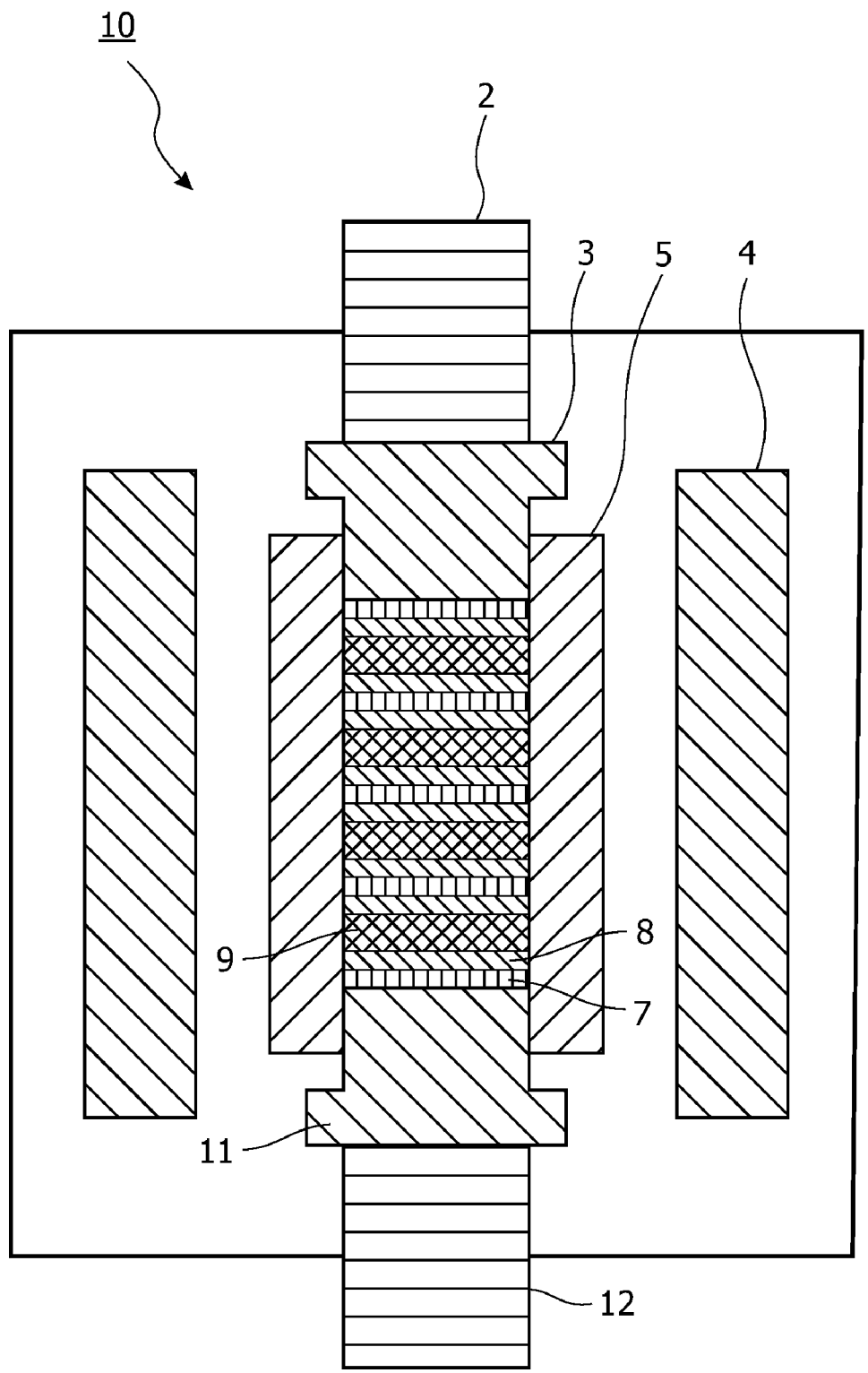
FIG. 2 shows a further apparatus according to the present invention designed for hot uniaxial pressing with pressure being applied from two directions.

FIG. 2 shows further apparatus (10) according to the present invention designed for hot uniaxial pressing with pressure being applied from two directions. A piston (2) transfers pressure onto a die (3). This die (3) fits inside a mould (5). On the bottom of the mould (5), a further die (11), which is movable and driven by a second piston (12), is located. This arrangement is heated by a heater (4). Inside the mould there are layers of ceramic powder (9) who are in contact with molybdenum foil (8). The molybdenum foil layers in turn are in contact with layers of graphite solids (7). It is to be noted that pistons (2) and (12), dies (3) and (11), heater (4), mould (5), second die (6) and the layers of graphite (7), molybdenum foil (8) and ceramic powder (9) are arranged in a cylinder symmetric fashion around a vertical symmetry axis and in a mirror symmetric fashion around a horizontal symmetry axis.

Figure 3:
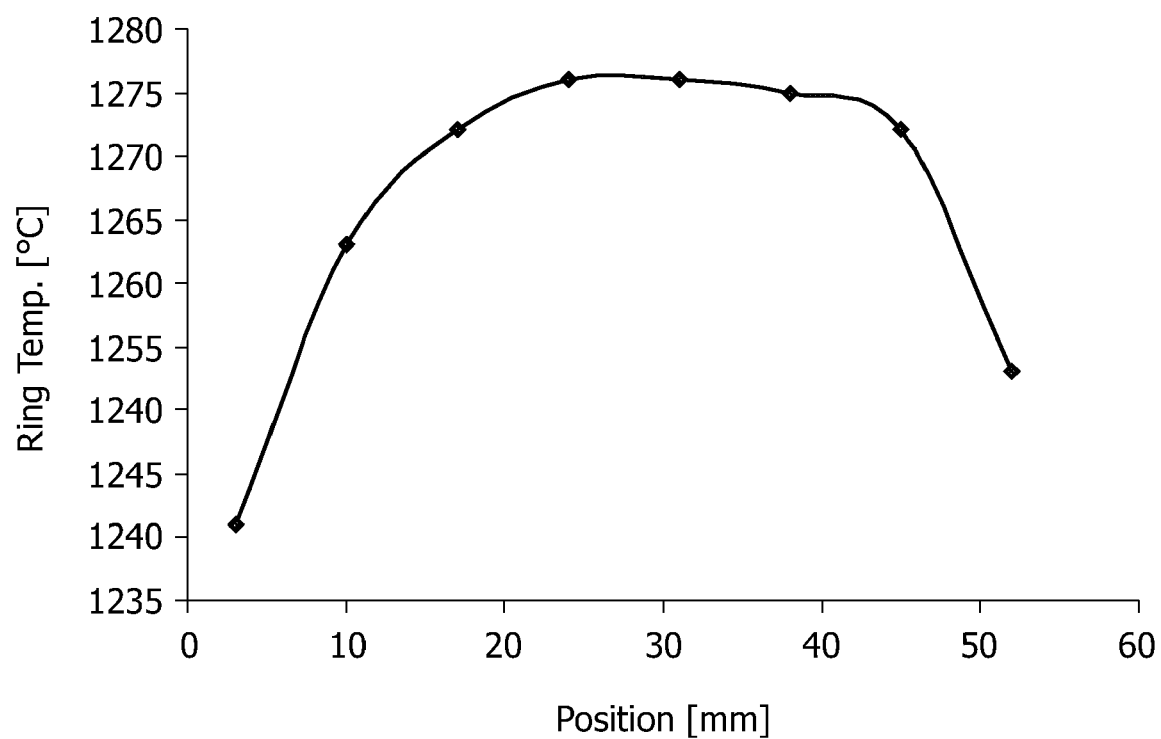
FIG. 3 shows a graph depicting temperatures indicated by process temperature control rings in an apparatus according to the present invention.
Figure 4:
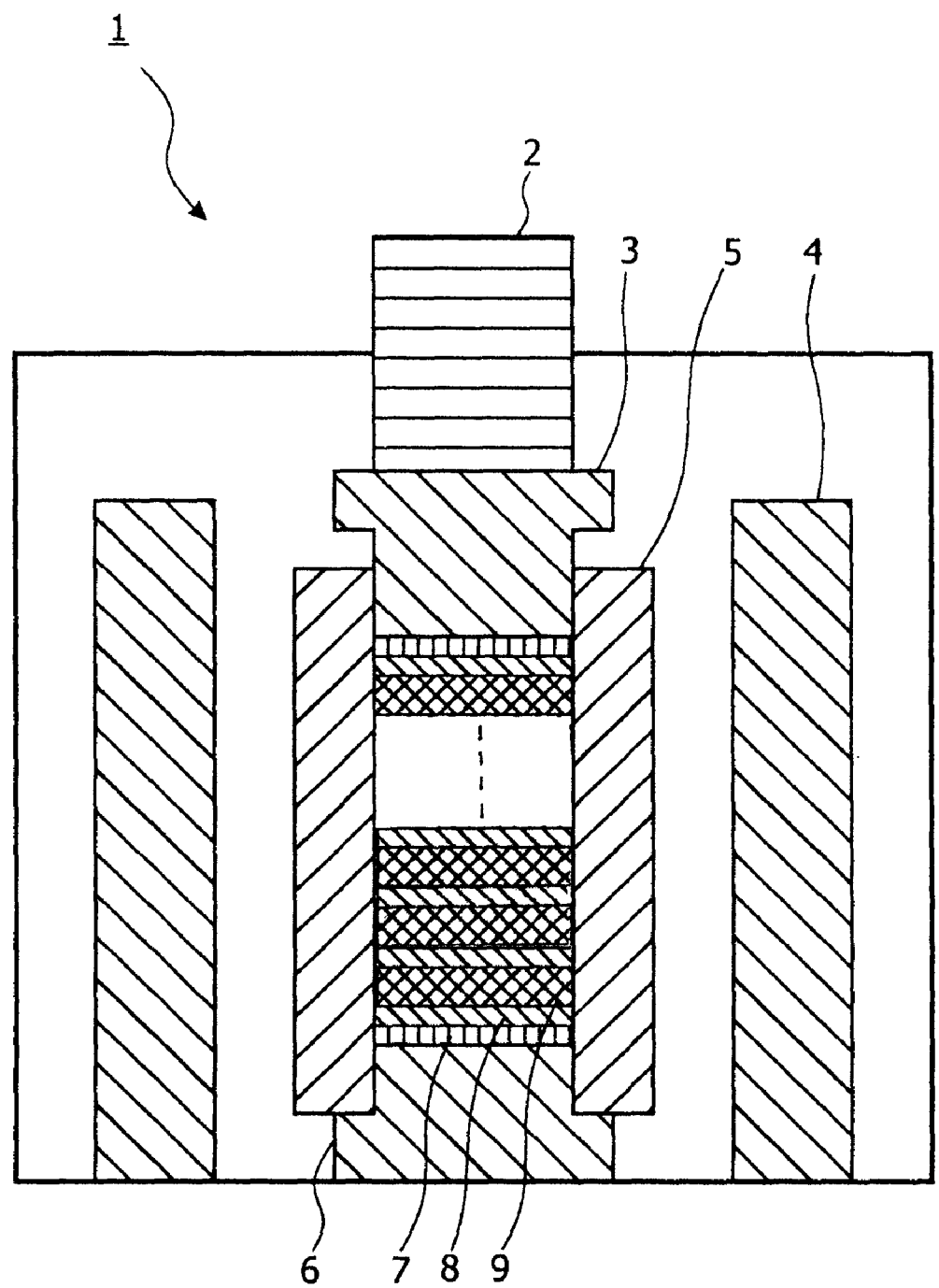
FIG. 4 shows an apparatus for hot uniaxial seal pressing with an alternate layering of the stack.

FIG. 3 shows a graph depicting temperatures indicated by process temperature control rings in an apparatus according to the present invention. The x-axis shows the central position of the rings along the longitudinal axis of the mould. The y-axis shows the temperature that was correlated with the shrinkage of the rings after heating the apparatus. The process temperature control rings have been debindered prior to use by heating in air for two hours at 750° C. with a heating/cooling rate of 3 K/min. The rings used were FERRO PTCR-STH-Rings (1130-1400° C.), lot 218. As can be seen, the temperature measured rises sharply with increasing proximity to the central part of the mould, where it remains on a plateau where the temperature ranges from 1272° C. to 1276° C. This is considered an isothermal zone for the purposes of the present invention. With increasing distance from the central part of the mould, the registered temperature falls sharply again.

To provide a comprehensive disclosure without unduly lengthening the specification, the applicant hereby incorporates by reference each of the patents and patent applications referenced above.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

LIST OF REFERENCE SIGNS

1 Apparatus according to the present invention
2 Piston
3 Die
4 Heater
5 Mould
6 Second die
7 Graphite solid
8 Molybdenum foil
9 Ceramic powder
10 Further apparatus according to the present invention
11 Further die
12 Second piston

The invention claimed is:

1. A process for the production of ceramics comprising the steps of:
   a) placing a graphite layer into a mold arranged inside a heater and configured to receive a die, the mold being a solid-solution hardened and particle-strengthened molybdenum-based alloy comprising titanium carbide and zirconium carbide;
   b) placing a molybdenum foil onto the graphite layer in the mold;
   c) placing a ceramic powder onto the molybdenum foil;
   d) placing additional layers of ceramic powder and additional layers of molybdenum foil and graphite layer between each layer of ceramic powder in the mold to form a stack;
   e) arranging a second to last layer of the stack to be molybdenum foil;
   f) arranging a last layer of the stack to be a graphite layer;
   g) creating a vacuum of $\geq 1\times 10^{-8}$ bar to $\leq 1\times 10^{-3}$ bar within the pressing apparatus;
   h) heating to a temperature of $\geq 1000°$ C. to $\leq 1400°$ C.;
   i) applying a pressure of $\geq 100$ MPa to $\leq 220$ MPa with the die; and
   wherein the ceramic powder comprises $Gd_2O_2S$ doped with an element selected from the group comprising Eu, Tb, Yb, Dy, Sm, Ho, Ce and/or Pr and the graphite layer has a porosity of about 20%.

2. The process according to claim 1, wherein the material of the mold and/or die has a thermal conductivity of $\geq 50$ W/m K to $\leq 150$ W/m K.

3. The process according to claim 1, wherein the material of the mold and/or die has a compression strength of $\geq 50$ MPa to $\leq 300$ MPa.

4. The process according to claims 1, wherein an inner diameter of the mold is at least $\geq 10$ mm.

5. The process according to claim 1, wherein the arrangement of heater and mold and/or die is substantially rotationally symmetric with respect to a vertical symmetry axis.

6. The process according to claim 1, wherein the arrangement of heater and mold and/or die is substantially mirror symmetric with respect to a horizontal symmetry axis.

7. A process for the production of ceramics comprising the steps of:
   a) placing a graphite solid into a mold arranged inside a heater and configured to receive a die;
   b) placing a molybdenum foil onto the graphite solid of step a);
   c) placing a ceramic powder comprising $Gd_2O_2S$ doped with an element selected from the group comprising Eu, Tb, Yb, Dy, Sm, Ho, Ce and/or Pr onto the molybdenum foil of step b);
   d) placing alternating layers of molybdenum foil, ceramic powder and graphite solid onto the ceramic powder of step c) to form a stack with layers of molybdenum foil and graphite solid between the layers of ceramic powder;
   e) arranging a second to last layer of the stack to be molybdenum foil;
   f) arranging a last layer of the stack to be graphite solid;
   g) creating a vacuum of $\geq 1\times 10^{-8}$ bar to $\leq 1\times 10^{-3}$ bar within the pressing apparatus;
   h) heating to a temperature of $\geq 1000°$ C. to $\leq 1400°$ C.; and
   i) applying a pressure of $\geq 100$ MPa to $\leq 220$ MPa with the die
   wherein the graphite solid has a porosity of about 20% to ensure rapid evacuation.

8. The method according to claim 7, wherein the molybdenum foil layers are smaller than an interior cross second of the mold such that evacuating the stack is facilitated.

9. The process according to claim 7, wherein at least one surface which is in contact with the ceramic powder is at least partially covered with boron nitride.

10. A process for the production of $Gd_2O_2S$ ceramic scintillators comprising:
    a) placing a first graphite solid layer into a mold on a lower die;
    b) placing a first layer of molybdenum foil onto the first graphite solid layer in the mold;
    c) placing a first layer of $Gd_2O_2S$ powder doped with an element selected from the group comprising one or more of Eu, Tb, Yb, Dy, Sm, Ho, Ce and Pr onto the first layer of molybdenum foil in the mold;
    d) placing a top layer of molybdenum foil in the mold;
    e) placing a top graphite solid layer on the top layer of molybdenum foil;
    f) placing an upper die in the mold on the top graphite layer;
    g) creating a vacuum of $\geq 1\times 10^{-8}$ bar to $\leq 1\times 10^{-3}$ bar within the mold;
    h) heating to a temperature of $\geq 1000°$ C. to $\leq 1400°$ C.; and
    i) applying a pressure of $\geq 100$ MPa to $\leq 220$ MPa
    wherein the first and top graphite solid layers are separate from the lower and upper dies and have a porosity of about 20%.

11. The process according to claim 10, further including:
repeating steps (b) and (c) to form additional alternating layers of molybdenum foil and doped $Gd_2O_2S$ powder.

12. The process according to claim 10, further including between steps (c) and (d):
placing a second layer of molybdenum foil on the first layer of doped $Gd_2O_2S$ powder;
placing a second graphite solid layer on the second molybdenum foil layer;
placing a third layer of molybdenum foil on the second graphite solid layer;
placing a second layer of doped $Gd_2O_2S$ powder on the third molybdenum foil layer.

13. The process according to claim 10, further including:
at least partially covering at least one surface of the molybdenum foil which contacts the $Gd_2O_2S$ powder with boron nitride.

14. The method according to claim 10, wherein step (h) includes heating to a temperature of $\geqq 1200°$ C. to $\leqq 1250°$ C.

15. The method according to claim 10, wherein the molybdenum foil layers are smaller than an interior cross section of the mold.

16. The method according to claim 10, further including:
placing additional layers of molybdenum foil, doped $Gd_2O_2S$ powder, and graphite solid layer in the mold.

* * * * *